United States Patent
Oyaizu et al.

(10) Patent No.: US 8,693,627 B2
(45) Date of Patent: Apr. 8, 2014

(54) INTENSIFYING SCREEN FOR X-RAY DETECTOR, X-RAY DETECTOR, AND X-RAY INSPECTION APPARATUS

(75) Inventors: Eiji Oyaizu, Yokohama (JP); Akihisa Saito, Yokohama (JP); Yoshitaka Adachi, Yokohama (JP); Kazumitsu Morimoto, Kamakura (JP)

(73) Assignees: Kabushiki Kaisha Toshiba, Tokyo (JP); Toshiba Materials Co., Ltd., Yokohama-shi (JP)

( * ) Notice: Subject to any disclaimer, the term of this patent is extended or adjusted under 35 U.S.C. 154(b) by 0 days.

(21) Appl. No.: 13/477,503

(22) Filed: May 22, 2012

(65) Prior Publication Data

US 2013/0083891 A1 Apr. 4, 2013

Related U.S. Application Data

(63) Continuation of application No. PCT/JP2012/000307, filed on Jan. 19, 2012.

(30) Foreign Application Priority Data

Oct. 3, 2011 (JP) ................................ 2011-219627

(51) Int. Cl.
*G01T 1/202* (2006.01)
*C09K 11/85* (2006.01)
*C09K 11/84* (2006.01)
*G01N 23/04* (2006.01)
*G01N 23/204* (2006.01)

(52) U.S. Cl.
USPC ......... 378/57; 378/87; 250/483.1; 250/487.1; 252/301.36

(58) Field of Classification Search
USPC ................. 250/370.09–370.11, 483.1–488.1; 378/19
See application file for complete search history.

(56) References Cited

U.S. PATENT DOCUMENTS

| 4,059,768 A | * | 11/1977 | Van Landeghem et al. ............. 250/483.1 |
| 4,080,306 A | * | 3/1978 | Ferretti .................. 252/301.4 H |
| 4,316,817 A | * | 2/1982 | Cusano et al. ........... 252/301.18 |
| 5,302,817 A | | 4/1994 | Yokota et al. |
| 2006/0054830 A1 | * | 3/2006 | Oyaizu et al. ............. 250/370.11 |
| 2006/0065852 A1 | * | 3/2006 | Fukui et al. ................ 250/484.4 |

FOREIGN PATENT DOCUMENTS

| JP | 05-100037 A | 4/1993 |
| JP | 2006-105597 A | 4/2006 |
| JP | 2007-314709 A | 12/2007 |
| WO | WO 2004/029657 A1 | 4/2004 |

* cited by examiner

*Primary Examiner* — Hoon Song
*Assistant Examiner* — Danielle Fox
(74) *Attorney, Agent, or Firm* — Foley & Lardner LLP (57) ABSTRACT

In an embodiment, an X-ray detector has a transmissive fluorescence generating portion, and a reflective fluorescence generating portion. The transmissive and reflective fluorescence generating portions have at least one of an intensifying screen having a phosphor layer that contains praseodymium-activated gadolinium oxysulfide phosphor particles in which a ratio of particles having a particle diameter falling in ±30% of a center particle diameter is 45% by volume or more and their filling rate is 60% by volume or more, and an intensifying screen having a phosphor layer that contains europium-activated barium fluorochloride phosphor particles in which a ratio of particles having a particle diameter falling in ±30% of a center particle diameter is 45% by volume or more and their filling rate is 45% by volume or more.

20 Claims, 7 Drawing Sheets

INTENSIFYING SCREEN FOR X-RAY DETECTOR, X-RAY DETECTOR, AND X-RAY INSPECTION APPARATUS

CROSS-REFERENCE TO RELATED APPLICATIONS

This application is a continuation of prior International Application No. PCT/JP2012/000307, filed on Jan. 19, 2012 which is based upon and claims the benefit of priority from Japanese Patent Application No. 2011-219627, filed on Oct. 3, 2011; the entire contents of all of which are incorporated herein by reference.

FIELD

Embodiments described herein relate generally to an intensifying screen for an X-ray detector, an X-ray detector, and an X-ray inspection apparatus.

BACKGROUND

It is general that luggage to be loaded onto an aircraft is previously inspected at an airport to secure the safety operation of the aircraft. As a luggage inspection system, it is general to use a transmission X-ray inspection apparatus using transmission of X-rays or a Compton scattered X-ray inspection apparatus using Compton scattering of X-rays. By the X-ray inspection apparatus using transmitted X-rays or Compton scattered X-rays, transmitted X-rays or Compton scattered X-rays are led to an X-ray detector. The detected X-rays are converted into visible light by a phosphor. The intensity of visible light is detected by a photomultiplier. The inside of the luggage is imaged according to the intensity of visible light to inspect the luggage.

To improve luggage inspection accuracy, it is necessary to obtain a clearer image. For that purpose, it is required to input a sufficient intensity of visible light to the photomultiplier. The intensity of visible light can be enhanced according to the intensity of X-rays irradiated to the luggage or the like. But, when the intensity of X-rays irradiated is enhanced, the X-ray inspection apparatus which is installed in a public place such as an airport luggage inspection system becomes large in size, and a risk increases. Therefore, there is a demand for a phosphor having a high efficiency of converting X-rays into visible light. When the phosphor excelling in efficiency of converting to the visible light is used, high luminance visible light can be obtained without enhancing the irradiation intensity of X-rays, and it is possible to input the visible light having sufficient intensity to the photomultiplier as a result.

As the phosphor used for the X-ray inspection apparatus, there are known a rare earth oxysulfide phosphor having a composition represented by $A_2O_2S:D$ (A is at least one element selected from Gd, La and Y, and D is at least one element selected from Tb and Pr or a mixture of this element and at least one element selected from Ce and Yb), and a barium halide phosphor having a composition represented by BaFX:E (X is at least one element selected from Cl and Br, and E is Eu or a mixture of Eu and at least one element selected from Ce and Yb). These phosphors are effective as phosphors for the X-ray inspection apparatus because they are excellent in efficiency of converting the transmitted X-rays or the Compton scattered X-rays into visible light.

Since the inspected luggage diversifies in these days, there are demands that complicated shapes are determined more accurately. When the intensity of the irradiated X rays is enhanced to improve the inspection sensitivity by enhancing the inspection image, the X-ray inspection apparatus is made to have a large size as described above, and a risk increases. Therefore, there are strong demands for an X-ray detector which provides satisfactory detection sensitivity even when the irradiation X-rays of relatively low intensity are used. In addition, there are strong demands for an X-ray inspection apparatus which is small, has less risk and can obtain a clear inspection image by using the above X-ray detector.

DETAILED DESCRIPTION

In one embodiment, an intensifying screen for an X-ray detector includes a support and a phosphor layer which is formed on the support and contains phosphor particles made of a praseodymium-activated gadolinium oxysulfide phosphor and a binder. The phosphor particles have a particle size distribution in which a ratio of particles having a particle diameter falling in a range of [D1±0.3D1] with respect to a center particle diameter D1 is 45% by volume or more. A filling rate of the phosphor particles in the phosphor layer is determined to be 60% by volume or more.

In another embodiment, an intensifying screen for an X-ray detector includes a support and a phosphor layer which is formed on the support and contains phosphor particles made of a europium-activated barium fluorochloride phosphor and a binder. The phosphor particles have a particle size distribution in which a ratio of particles having a particle diameter falling in a range of [D2±0.3D2] with respect to a center particle diameter D2 is 45% by volume or more. A filling rate of the phosphor particles in the phosphor layer is determined to be 45% by volume or more.

Figure 1:
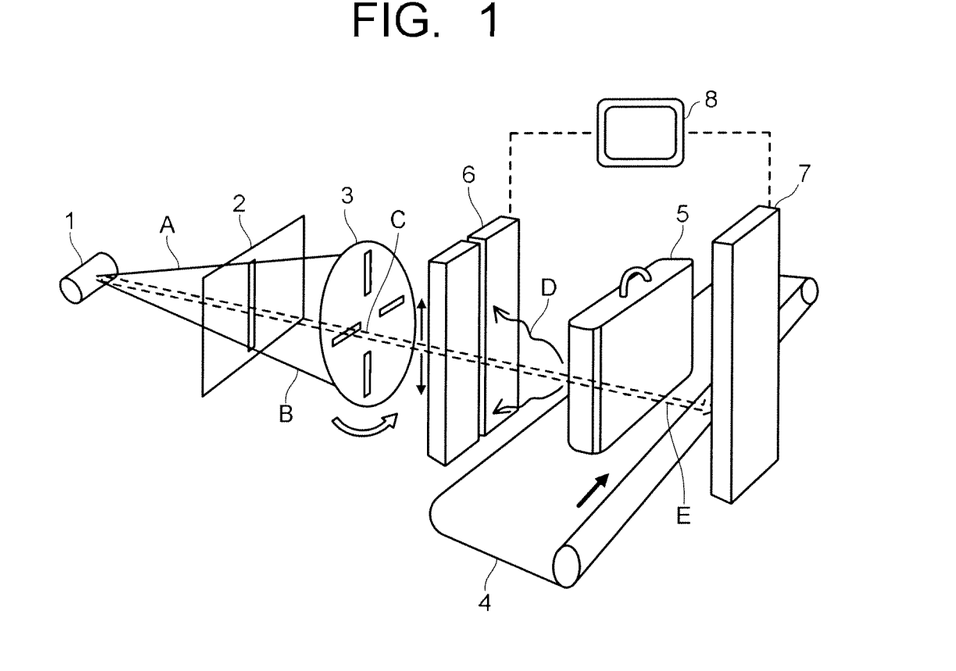
FIG. 1 is a perspective view schematically showing a structure of the X-ray inspection apparatus of an embodiment.
Figure 2:
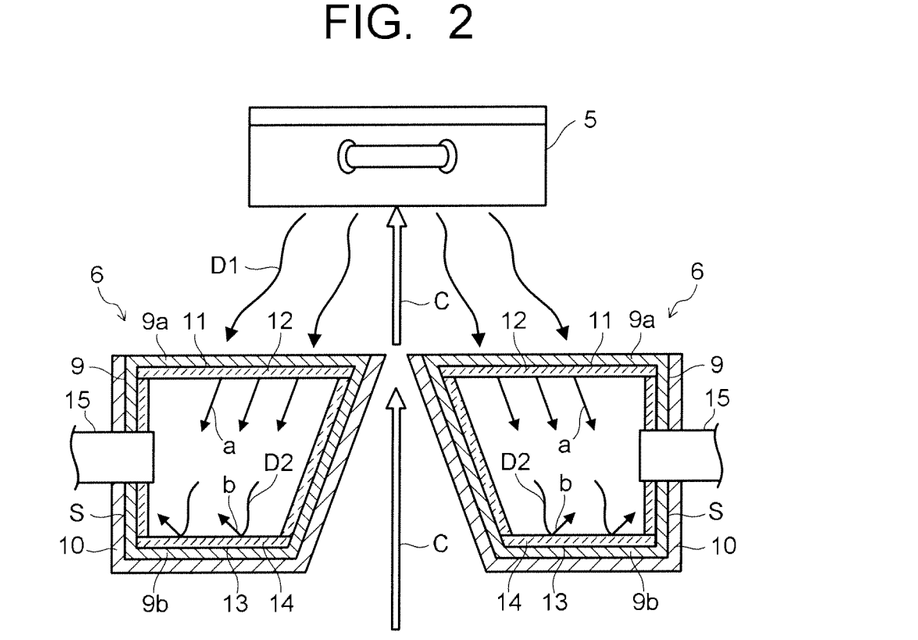
FIG. 2 is a sectional view showing a structure of the X-ray detector of the embodiment.
Figure 3:
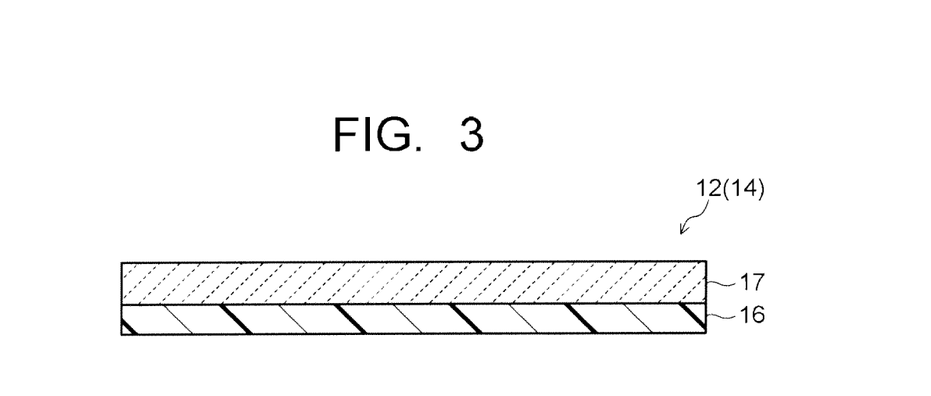
FIG. 3 is a sectional view showing a first structure example of the intensifying screen of the embodiment.
Figure 4:
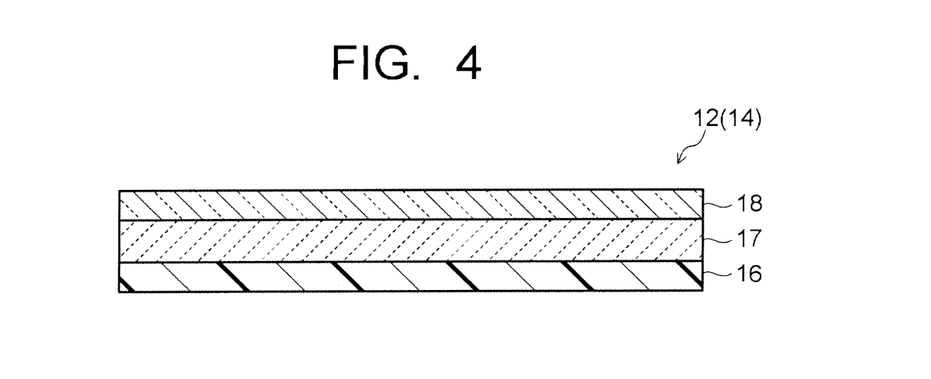
FIG. 4 is a sectional view showing a second structure example of the intensifying screen of the embodiment.
Figure 5:
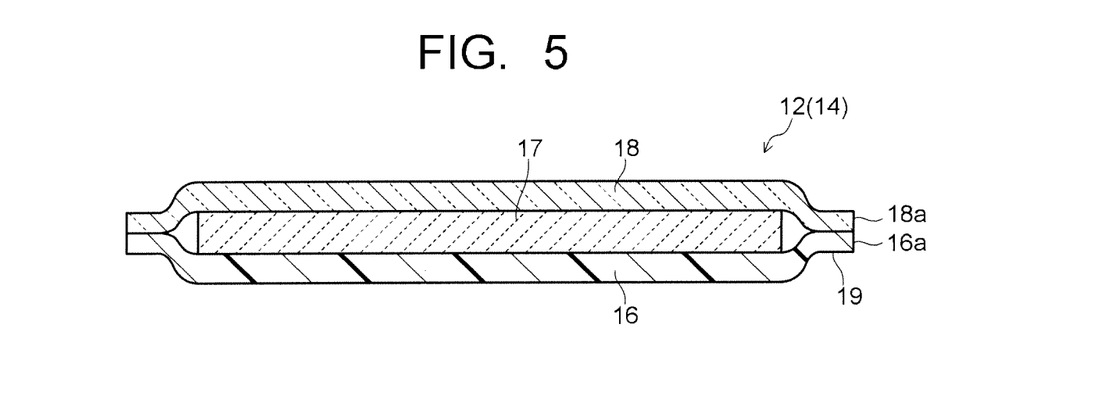
FIG. 5 is a sectional view showing a third structure example of the intensifying screen of the embodiment.

An intensifying screen for an X-ray detector, an X-ray detector, and an X-ray inspection apparatus according to an embodiment are described below. FIG. 1 is a diagram schematically showing a structure of the X-ray inspection apparatus according to the embodiment. FIG. 2 is a diagram showing a structure of the X-ray detector used for the X-ray inspection apparatus shown in FIG. 1. FIG. 3 to FIG. 5 are diagrams showing structure examples of the intensifying screen used for the X-ray detector shown in FIG. 2. The X-ray inspection apparatus shown in FIG. 1 is applied to, for example, an airport luggage inspection system.

The X-ray inspection apparatus shown in FIG. 1 has an X-ray tube 1 as an X-ray irradiation unit. X-rays A emitted from the X-ray tube 1 are collimated in a slit shape having a predetermined width by a linear collimator 2. Collimated X-rays B are formed to have a pencil beam shape to repeat a linear motion by a rotating collimator 3 having a plurality of slits in a radial direction. X-rays C having a pencil beam shape are irradiated to scan an inspected object such as luggage 5 being transported by, for example, a conveyer 4. The inspected object luggage 5 is moved at a speed depending on the detection sensitivity of the X-rays.

The X-rays reflected by the luggage 5, that is, Compton scattered X-rays D, are detected by a scattering X-ray detector 6. The X-rays E transmitted through the luggage 5 are detected by a transmitted X-ray detector 7. The Compton scattered X-rays D detected by the scattering X-ray detector 6 and the transmitted X-rays E detected by the transmitted X-ray detector 7 are measured as continuous intensity values. According to the X-ray intensity, the inside status of the luggage 5 is imaged as a picture on a display unit 8 such as a liquid crystal display. The inside of the luggage 5 is examined by the picture shown on the display unit 8.

The scattering X-ray detector 6 and the transmitted X-ray detector 7 have the following structure. The scattering X-ray detector 6 is described as an example. The basic structure of the transmitted X-ray detector 7 is same to that of the scattering X-ray detector 6. As shown in FIG. 2, two scattering X-ray detectors 6 are arranged to form a clearance for passing the pencil beam X-rays C. The arrangement style and arranged number of the scattering X-ray detectors 6 are not limited to the above, but it is appropriate to have a structure that allows the passage of the X-rays C and the incidence of the scattering X-rays from the luggage 5.

The scattering X-ray detectors 6 have a detector main body 9 having a cabinet shape with one side inclined. The surface of the detector main body 9 opposed to the luggage 5 is determined to be an X-ray incident portion 9a. The X-ray incident portion 9a is formed of a material, such as a resin, which transmits the X-rays. Another portion 9b of the detector main body 9 excepting the X-ray incident portion 9a is formed of, for example, aluminum to maintain the strength of the detector main body 9. The outside surface of the portion 9b of the detector main body 9 excepting the X-ray incident portion 9a is covered with an X-ray shielding member 10 of lead or the like. It is used to eliminate the influence of the X-rays from the outside.

A transmissive fluorescence generating portion 11 is disposed inside the X-ray incident portion 9a of the detector main body 9. The transmissive fluorescence generating portion 11 has a transmission type intensifying screen 12 which directs light toward the inside of the detector main body 9. A reflective fluorescence generating portion 13 is disposed inside the portion 9b of the detector main body 9 excepting the X-ray incident portion 9a. The reflective fluorescence generating portion 13 is disposed along the inside wall surface of the portion 9b of the detector main body 9 excepting the X-ray incident portion 9a. The reflective fluorescence generating portion 13 has a reflection type or transmission type intensifying screen 14. The reflection type intensifying screen 14 is arranged to direct the reflected light toward the inside of the detector main body 9. In a case where the transmission type intensifying screen 14 is used, the light emission by the intensifying screen 14 is reflected by the detector main body 9 or the like and guided toward the inside of the detector main body 9.

A photomultiplier 15 is disposed as a photoelectric conversion portion on a side surface S of the detector main body 9 which is perpendicular to the X-ray incident surface 9a. The photomultiplier 15 is installed to receive the visible lights emitted from the transmissive fluorescence generating portion 11 and the reflective fluorescence generating portion 13. The photomultiplier 15 preferably has a peak light receiving sensitivity at approximately 400 nm. A specific example of the photomultiplier 15 is an R-1307 (trade name) manufactured by Hamamatsu Photonix Co. But, it is not limited to the above.

Compton scattered X-rays D1 incident on the X-ray incident portion 9a of the X-ray detector 6 is irradiated to the intensifying screen 12 of the transmissive fluorescence generating portion 11. The intensifying screen 12 emits visible light "a" according to the selected phosphor on the basis of the irradiation of the Compton scattered X-rays D1. The visible light "a" is irradiated toward the inside of the detector main body 9. Compton scattered X-rays D2 transmitted through the X-ray incident portion 9a is irradiated to the intensifying screen 14 of the reflective fluorescence generating portion 13. The intensifying screen 14 emits visible light "b" according to the selected phosphor on the basis of the irradiation of the Compton scattered X-rays D2. The visible light "b" is irradiated toward the inside of the detector main body 9. The visible lights "a" and "b" are detected by the photomultiplier 15, and the total intensity of the visible lights "a" and "b" is measured. Thus, the Compton scattered X-rays which have been incident on the X-ray detector 6, namely the Compton scattered X-rays D from the luggage 5, are measured for the intensity.

An inspection principle utilized for the Compton scattered X-rays is as follows. Intensity I after X-rays having energy $E_0$ and intensity $I_0$ are transmitted through an absorber having thickness "t" is determined by the following equation (1).

$$I = I_0 e^{-\mu t} \quad (1)$$

In the equation (1), $\mu$ is a coefficient (unit: $cm^{-1}$) which is inherent to a substance and called as a linear attenuation coefficient, indicating a ratio of attenuation when the X-rays having energy $E_0$ travel 1 cm. And, $\mu$ has a property that it is large as the substance has a larger atomic number and can be decomposed as represented by the following equation (2).

$$\mu = \tau + \sigma_T + \sigma_C + \kappa \quad (2)$$

In the equation (2), $\tau$ is an absorption coefficient by a photoelectric effect, $\sigma_T$ is a scattering coefficient by Thomson scattering, $\sigma_C$ is a scattering coefficient by Compton scattering, and $\kappa$ is an absorption coefficient by electron pair creation.

When the X-rays having energy $E_1$ and intensity $I_0$ is incident to reach a position at a depth x from the surface of the absorber, intensity $I_1$ of the X-rays at the position x can be determined by the following equation (3).

$$I_1 = I_0 e^{-\mu x} \quad (3)$$

In the equation (3), μ is a linear attenuation coefficient of the X-rays having energy $E_1$. Intensity $I_2$ of the Compton scattered X-rays which are generated at the position x and scattered in a direction of angle θ with respect to the incident direction of the X-rays is determined by the following equation (4).

$$I_2 = a\sigma_c I_1 \quad (4)$$

In the equation (4), "a" is a proportional constant.

Intensity $I_3$ when the generated Compton scattered X-rays come out from the surface is determined by the equation (5) because the distance from the generated point to the surface is bx (b=1/cos θ).

$$I_3 = I_2 e^{-\mu' b x} \quad (5)$$

In the equation (5), μ' is a linear attenuation coefficient of the scattering X-rays. Accordingly, the intensity $I_3$ of the Compton scattered X-rays is determined by the following equation (6) on the basis of the equations (3), (4) and (5).

$$I_3 = a\sigma_c I_0 e^{-(\mu+b\mu')x} \quad (6)$$

Therefore, a total amount of the Compton scattered X-rays passing through an absorber having thickness t can be determined by the following equation (7).

$$\begin{aligned}
C &= \int_0^t I_3 \, dx \\
&= \int_0^t a\sigma_c I_0 e^{-(\mu+b\mu')x} \, dx \\
&= a\sigma_c I_0 / (\mu + b\mu') \times \left(1 - e^{-(\mu+b\mu')t}\right)
\end{aligned}$$

where, when $e^{-(\mu+b\mu')t} \ll 1$, $$C = a\sigma_c I_0 / (\mu + b\mu') \quad (7)$$

Since $aI_0$ is a constant value not depending on the atomic number, the intensity of the Compton scattered X-rays is variable depending on the value of $\sigma_c/(\mu+b\mu')$ which is variable depending on the substance. The value of $\sigma_c/(\mu+b\mu')$ increases as the substance has a smaller atomic number. Therefore, a substance mainly comprising elements having a small atomic number such as a plastic product can be distinguished by detecting the Compton scattered X-rays. That is, plastic products and the like can be inspected.

The intensifying screens 12 and 14 used for the transmissive fluorescence generating portion 11 and the reflective fluorescence generating portion 13 includes a support 16 which is composed of a plastic film or nonwoven fabric, and a phosphor layer 17 which is formed on the support 16. The phosphor layer 17 is formed by, for example, coating a slurry mixture of phosphor particles and a binder on the support 16. The binder forming the phosphor layer 17 is generally a resin binder, for which various types of organic resins are used. The slurry mixture (coating layer) coated on the support 16 is preferably passed together with the support 16 through a press machine. The phosphor layer 17 contains the phosphor particles and the binder (e.g., a resin binder).

The phosphor particles constituting the phosphor layer 17 are made of a praseodymium-activated gadolinium oxysulfide phosphor or a europium-activated barium fluorochloride phosphor. The praseodymium-activated gadolinium oxysulfide phosphor preferably has a composition represented by a general formula:

$$Gd_2O_2S:Pr_a \quad (8)$$

where, "a" is an activation amount of praseodymium (Pr) with respect to 1 mol of gadolinium oxysulfide ($Gd_2O_2S$), and it is preferably in a range of 0.0001 to 0.005 mol. If the Pr activation amount is less than 0.0001 mol, its existence to become a luminescence center is small, thus falling easily into a state that light is not emitted efficiently. If the Pr activation amount exceeds 0.005 mol, luminous efficiency is deteriorated easily because of a phenomenon called as concentration quenching. Pr may be partly substituted by Tb, Yb, Ce or the like. Gd may be substituted by La, Y or the like.

The europium-activated barium fluorochloride phosphor preferably has a composition represented by a general formula:

$$BaFCl:Eu_b \quad (9)$$

where, "b" is an activation amount of europium (Eu) with respect to 1 mol of barium fluorochloride (BaFCl), and it is preferably in a range of 0.003 to 0.015 mol. If the Eu activation amount is less than 0.003 mol, a luminescence center is small, thus falling easily into a state that light is not emitted efficiently. If the Eu activation amount exceeds 0.015 mol, luminous efficiency is deteriorated easily because of a phenomenon called as concentration quenching. Eu may be partly substituted by Ce, Yb or the like. F and Cl may be partly substituted by Br, I or the like.

Both the praseodymium-activated gadolinium oxysulfide phosphor and the europium-activated barium fluorochloride phosphor are excellent in efficiency of converting the transmitted X-rays and the Compton scattered X-rays into visible lights and effective as phosphors used for the transmissive fluorescence generating portion 11 and the reflective fluorescence generating portion 13 of the X-ray detector 6. But, since the inspected luggage types are diversified, the X-ray inspection apparatus is demanded to distinguish complex shapes more accurately. In this connection, the luminous efficiency of the phosphor for the X-rays, including the praseodymium-activated gadolinium oxysulfide phosphor and the europium-activated barium fluorochloride phosphor, has been improved in various ways, but significant improvement of the performance of the X-ray detector by that cannot be expected.

Under the above-described circumstance, for the praseodymium-activated gadolinium oxysulfide phosphor, there are used phosphor particles having a particle size distribution in which a ratio of particles having a particle diameter falling in a range of [D1±0.3D1] (±30% of the center particle diameter D1) with respect to the center particle diameter D1 (μm) of the phosphor particles is 45% by volume or more. In addition, it is determined that a filling rate of the praseodymium-activated gadolinium oxysulfide phosphor particles in the phosphor layer 17 is 60% by volume or more. By applying this phosphor layer 17, light emission outputs of the intensifying screens 12 and 14 can be improved. By enhancing the light emission outputs of the intensifying screens 12 and 14, it becomes possible to improve the detection sensitivity of the Compton scattered X-rays D, and thus, the inside of the luggage 5 as the inspected object can be imaged more clearly.

It is more preferable that a ratio of particles having a particle diameter in a range of [D1±0.3D1] (±30% of the center particle diameter D1) with respect to the center particle diameter D1 of the praseodymium-activated gadolinium oxysulfide phosphor particles is 50% by volume or more. In addition, it is preferable that the center particle diameter D1 of the phosphor particles is in a range of 1 to 20 μm. If the center particle diameter D1 of the phosphor particles is less than 1 μm, a light transmission rate of the phosphor layer 17 decreases, and there is a possibility that the light output decreases. If the center particle diameter D1 exceeds 20 μm, a yield when producing the phosphor decreases, possibly resulting in increasing the manufacturing cost. The center particle diameter D1 is more preferably in a range of 2 to 15 μm.

For the europium-activated barium fluorochloride phosphor, there are used phosphor particles having a particle size distribution in which a ratio of particles having a particle diameter in a range of [D2±0.3D2] (±30% of the center particle diameter D2) with respect to the center particle diameter D2 of the phosphor particles is 45% by volume or more. In addition, it is determined that the filling rate of the europium-activated barium fluorochloride phosphor particles in the phosphor layer 17 is 45% by volume or more. By applying the above phosphor layer 17, light emission outputs of the intensifying screens 12 and 14 can be improved. By enhancing the light emission outputs of the intensifying screens 12 and 14, it becomes possible to improve the detection sensitivity of the Compton scattered X-rays D, and thus, the inside of the luggage 5 can be imaged more clearly.

It is more preferable that a ratio of particles having a particle diameter in a range of [D2±0.3D2] (±30% of the center particle diameter D2) with respect to the center particle diameter D2 of the europium-activated barium fluorochloride phosphor particles is 50% by volume or more. In addition, it is preferable that the center particle diameter D2 of the phosphor particles is in a range of 1 to 20 μm. If the center particle diameter D2 of the phosphor particles is less than 1 μm, a light transmission rate of the phosphor layer 17 decreases, and there is a possibility that the light output decreases. If the center particle diameter D2 exceeds 20 μm, a yield when producing the phosphor decreases, possibly resulting in increasing the manufacturing cost. The center particle diameter D2 is more preferably in a range of 2 to 15 μm.

The above-described particle size distribution of the phosphor particles can be realized by, for example, removing small particles and large particles in the phosphor having a given particle size distribution by sieving, selecting an amount and type of flux for controlling the growth of the phosphor particles when synthesizing (sintering) the phosphor, or synthesizing the phosphor by using phosphor material having a sharp particle size distribution.

The particle size distribution of the phosphor particles can be measured by an electric resistance method. The center particle diameter of the phosphor particles is a particle diameter at a point intersecting the horizontal axis of 50% with respect to an accumulated particle size distribution (percentage) measured by the electric resistance method. The particle size distribution of the phosphor particles in the phosphor layer can be measured after obtaining only the phosphor particles by calcining the intensifying screen. Specifically, a fluorescent plate is cut into small pieces, which are then calcined at about 400 to 600° C. to remove organic compounds such as a binder, a support, a protection film and the like, thereby obtaining phosphor particles only. Otherwise, the phosphor layer is removed from the fluorescent plate by scraping, and calcining is performed under the above conditions to obtain the phosphor particles. If necessary, ultrasonic oscillation is used to improve dispersibility of the phosphor particles. Then, the particle size distribution of the obtained phosphor particles is measured.

The particle size distribution of the phosphor particles can also be measured by SEM observation of a cross section of the phosphor layer. Specifically, when the praseodymium-activated gadolinium oxysulfide phosphor is used, SEM photographs of a cross section of the phosphor layer are taken at a magnification of 400 to 1000 times, and about 200 or more of phosphor particles are measured from an area of about 18000 μm². The particle size distribution is evaluated according to the measured results. When the europium-activated barium fluorochloride phosphor is used, SEM photographs of a cross section of the phosphor layer are taken at a magnification of 600 to 1500 times, about 200 or more phosphor particles are measured from an area of about 2800 μm², and the particle size distribution is evaluated according to the measured results.

A filling rate P of the phosphor particles in the phosphor layer 17 is determined to be a value obtained by the equation (10).

$$P = V_P/V = W/V/\rho_P \qquad (10)$$

In the equation (10), $V_P$ is a volume of the phosphor, V is a volume of the phosphor layer, W is a mass of the phosphor, and $\rho_P$ is a density of the phosphor. The volume V of the phosphor layer is determined from a size (dimensions) of the phosphor layer and a thickness of the phosphor layer, and the thickness of the phosphor layer is measured from the SEM photograph or the like. The mass W of the phosphor is measured by obtaining the phosphor particles only by applying the above-described intensifying screen sintering method.

Figure 6:
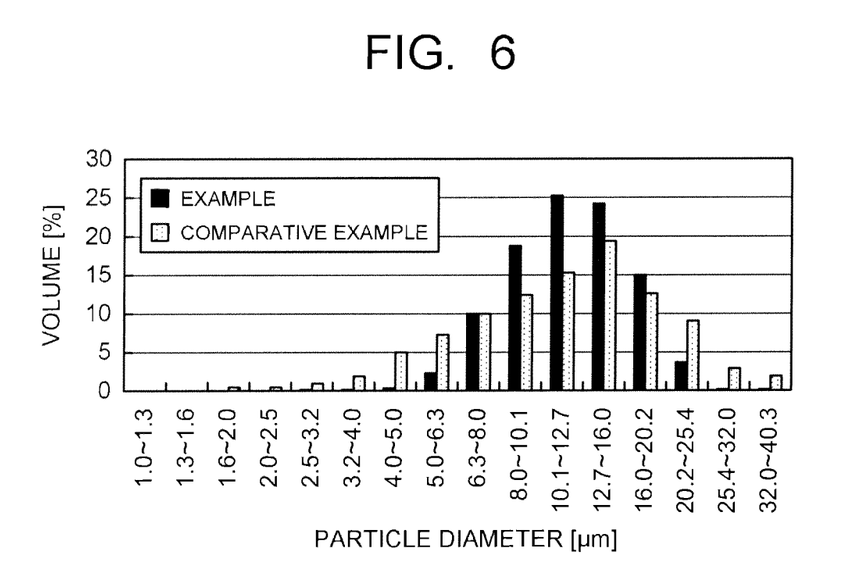
FIG. 6 is a diagram showing an example of a particle size distribution of praseodymium-activated gadolinium oxysulfide phosphor particles used for the intensifying screen of the embodiment.

FIG. 6 shows one sample (Example) of the particle size distribution of the praseodymium-activated gadolinium oxysulfide phosphor particles in comparison with conventional particle size distributions (Comparative Example). In FIG. 6, the praseodymium-activated gadolinium oxysulfide phosphor particles of the Example have a center particle diameter D1 of 11.9 μm, and a ratio of the particles having a particle diameter falling in a range of [D1±0.3D1] is 62% by volume. The praseodymium-activated gadolinium oxysulfide phosphor particles of the Comparative Example have a center particle diameter D1 of 11.9 μm, but a ratio of the particles having a particle diameter falling in a range of [D1±0.3D1] is 42% by volume.

Figure 7:
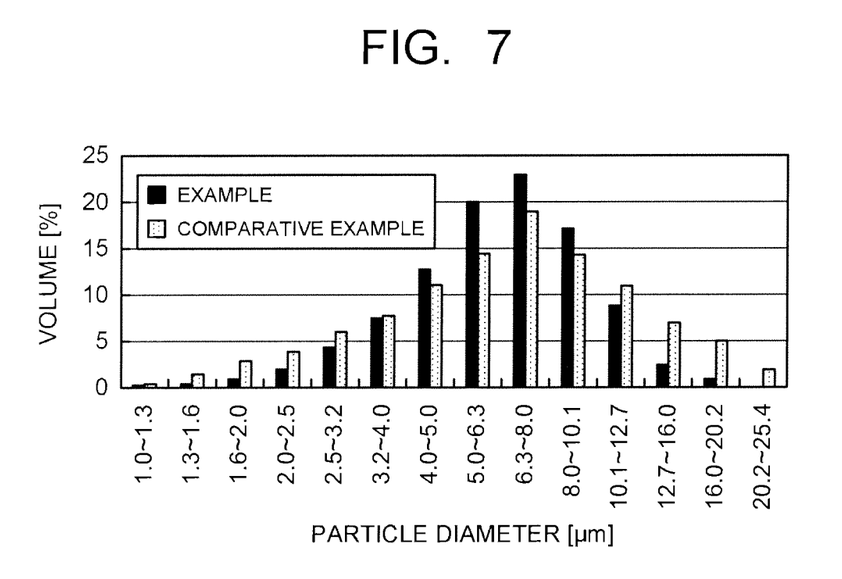
FIG. 7 is a diagram showing an example of a particle size distribution of europium-activated barium fluorochloride phosphor particles used for the intensifying screen of the embodiment.

FIG. 7 shows one sample (Example) of the particle size distribution of the europium-activated barium fluorochloride phosphor particles in comparison with conventional particle size distributions (Comparative Example). In FIG. 7, the europium-activated barium fluorochloride phosphor particles of the Example have a center particle diameter D2 of 6.4 μm, and a ratio of the particles having a particle diameter falling in a range of [D2±0.3D2] is 52% by volume. The europium-activated barium fluorochloride phosphor particles of the Comparative Example have a center particle diameter D2 of 6.4 μm, but a ratio of the particles having a particle diameter falling in a range of [D2±0.3D2] is 43% by volume.

As shown in FIG. 6 and FIG. 7, the praseodymium-activated gadolinium oxysulfide phosphor particles and the europium-activated barium fluorochloride phosphor particles used in the embodiment have features that many particles are present in a particle diameter range near the center particle diameter. By using the phosphor particles having the above particle size distributions, a filling rate of the phosphor particles in the phosphor layer 17 can be enhanced. As to the praseodymium-activated gadolinium oxysulfide phosphor, the phosphor particle filling rate can be determined to be 60% by volume. As to the europium-activated barium fluorochloride phosphor, the phosphor particle filling rate can be determined to be 45% by volume or more.

Figure 8:
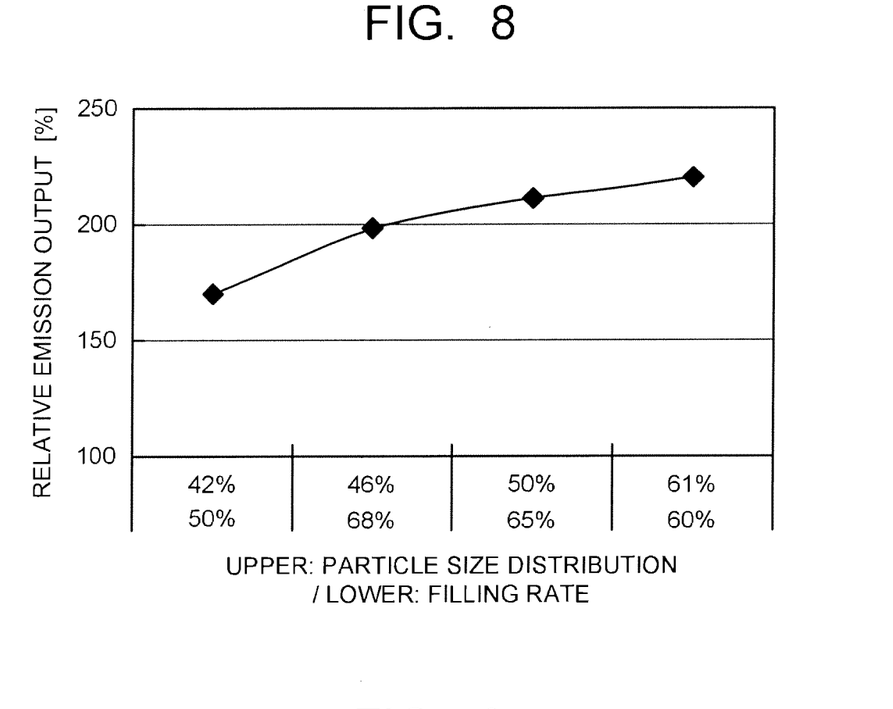
FIG. 8 is a diagram showing a relationship between a combination of a filling rate and a particle size distribution of the praseodymium-activated gadolinium oxysulfide phosphor particles forming a phosphor layer of the intensifying screen and light emission output of the intensifying screen.
Figure 9:
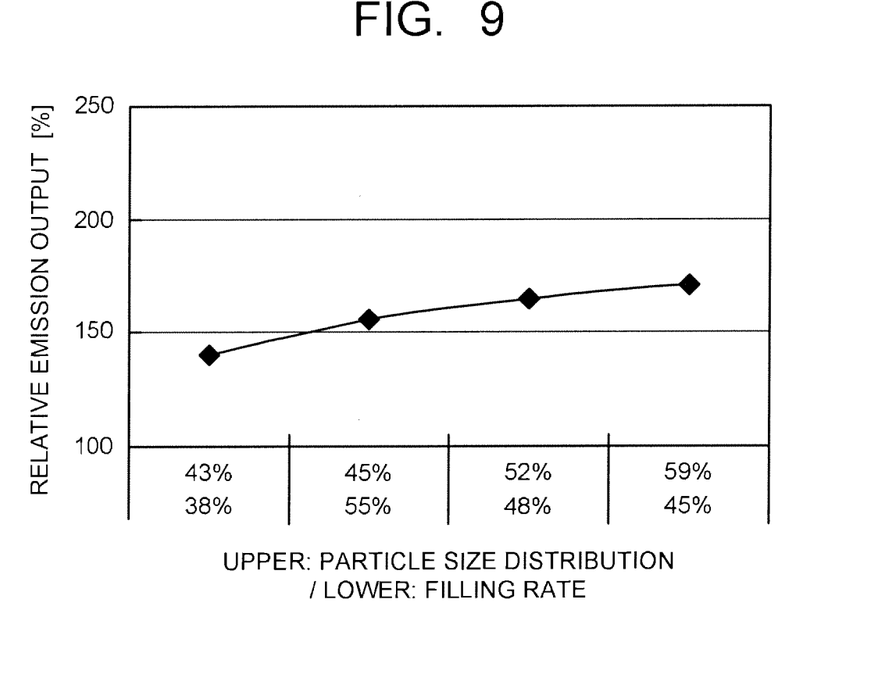
FIG. 9 is a diagram showing a relationship between a combination of a filling rate and a particle size distribution of the europium-activated barium fluorochloride phosphor particles forming a phosphor layer of an intensifying screen and light emission output of the intensifying screen.

Realization of the above-described particle size distribution and filling rate of the phosphor particles improves the light emission outputs of the intensifying screens 12 and 14, namely an output (luminance) of visible light emitted when the transmitted X-rays or the Compton scattered X-rays are irradiated to the intensifying screens 12 and 14. FIG. 8 shows light emission outputs of intensifying screens when a filling rate and a particle size distribution (a ratio of particles having a particle diameter falling in a range of [D1±0.3D1]) of the phosphor particles in the intensifying screen using the praseodymium-activated gadolinium oxysulfide phosphor are varied. FIG. 9 shows light emission outputs of intensifying screens when a filling rate and a particle size distribution (a ratio of particles having a particle diameter falling in a range of [D2±0.3D2]) of the phosphor particles in the intensifying screen using the europium-activated barium fluorochloride phosphor are varied. The light emission output is a relative value of luminance when X-rays having an X-ray tube voltage of 120 $kV_P$ are irradiated to the intensifying screen.

It is apparent from FIG. 8 that the intensifying screen using the praseodymium-activated gadolinium oxysulfide phosphor is provided with a high light emission output when the phosphor particles have a particle size distribution of 45% or more and a filling rate of 60% by volume or more. It is apparent from FIG. 9 that the intensifying screen using the europium-activated barium fluorochloride phosphor is provided with a high light emission output when the phosphor particles have a particle size distribution of 45% or more and a filling rate of 45% by volume or more. When the X-ray detectors 6 and 7 are configured by using the above-described intensifying screen, the luminance of the visible light to be input to the photomultiplier 15 can be enhanced. That is, the light outputs of the transmissive fluorescence generating portion 11 and the reflective fluorescence generating portion 13 can be improved. Therefore, the detection sensitivity of the Compton scattered X-rays and the transmitted X-rays by the X-ray detectors 6 and 7 is improved, and it becomes possible to make more clearly an image of the inside of the luggage 5 as the inspected object.

When the praseodymium-activated gadolinium oxysulfide phosphor particles are used, it is preferable that the filling rate of the phosphor particles in the phosphor layer 17 is determined to be in a range of 60 to 75% by volume. If the filling rate of the phosphor particles is less than 60% by volume, the light emission outputs of the intensifying screens 12 and 14 cannot be enhanced sufficiently. If the filling rate of the phosphor particles exceeds 75% by volume, the phosphor particles are possibly broken, and the light output might be deteriorated. When it is determined that a volume percentage (filling rate) of the phosphor particles in the phosphor layer 17 is in a range of 60 to 75%, it is preferable that the volume percentage of the binder is in a range of 5 to 15%, and the volume percentage of voids is in a range of 10 to 35%.

In a case where the praseodymium-activated gadolinium oxysulfide phosphor particles are used, the volume percentage of the binder is preferably small, and it is specifically 15% or less preferably to enhance the volume percentage (filling rate) of the phosphor particles. But, if the volume percentage of the binder is excessively small, the strength of the phosphor layer 17 might be lost. Therefore, the volume percentage of the binder is preferably determined to be 5% or more. To increase the contact of the phosphor particles and the binder to keep the strength of the phosphor layer 17, the volume percentage of the voids is preferably small, and it is specifically 35% or less preferably. But, if the volume percentage of the voids is decreased to zero, the load of the manufacturing process becomes large more than needed, and the manufacturing cost might increase. When the above phosphor particles are used, a stable characteristic can be obtained if the volume percentage of the voids is in a range of 10 to 35%.

In a case where the europium-activated barium fluorochloride phosphor particles are used, the filling rate of the phosphor particles in the phosphor layer 17 is preferably determined to be in a range of 45 to 60% by volume. If the filling rate of the phosphor particles is less than 45% by volume, light emission outputs of the intensifying screens 12 and 14 cannot be enhanced sufficiently. If the filling rate of the phosphor particles exceeds 60% by volume, the phosphor particles might be broken, and the light outputs are possibly decreased. When the volume percentage (filling rate) of the phosphor particles in the phosphor layer 17 is determined to be in a range of 45 to 60%, the volume percentage of the binder is in a range of 10 to 20%, and the volume percentage of the voids is preferably determined to be in a range of 20 to 45%.

In a case where the europium-activated barium fluorochloride phosphor particles are used, the volume percentage of the binder is preferably small, and it is specifically 20% or less preferably to enhance the volume percentage (filling rate) of the phosphor particles. But, if the volume percentage of the binder is excessively small, the strength of the phosphor layer 17 might be lost. Therefore, the volume percentage of the binder is preferably determined to be 10% or more. To increase the contact of the phosphor particles and the binder to keep the strength of the phosphor layer 17, the volume percentage of the voids is preferably small, and it is specifically 45% or less preferably. But, if the volume percentage of the voids is decreased to zero, the load of the manufacturing process becomes large more than needed, and the manufacturing cost might increase. When the above phosphor particles are used, a stable characteristic can be obtained if the volume percentage of the voids is in a range of 20 to 45%.

To improve the filling rate of the phosphor particles in the phosphor layer 17, it is effective to press under appropriate conditions to form the phosphor layer 17 in addition to the increase of the ratio of the phosphor particles while decreasing the binder amount. After a slurry mixture of the phosphor particles and the binder is coated on the support 16, the mixture coating layer is pressed under a pressure of 30 to 50 MPa for 20 to 40 minutes while heating at 60 to 80° C., and thereby, the filling rate of the phosphor particles can be improved. The filling rate of the phosphor particles can also be improved by continuously pressing by passing through rollers heated to 90 to 110° C. It is preferable that the pressure for continuous pressing is 5 to 25 MPa, and a line speed is 0.4 to 0.6 m/min.

A difference of filling rate between the praseodymium-activated gadolinium oxysulfide phosphor and the europium-activated barium fluorochloride phosphor depends mainly on the shapes of phosphor particles. The praseodymium-activated gadolinium oxysulfide phosphor particles have a shape close to a sphere, while the europium-activated barium fluorochloride phosphor particles contain a relatively large number of irregular shaped particles. Therefore, the filling rate of the praseodymium-activated gadolinium oxysulfide phosphor particles is more likely to be improved, and the light emission outputs of the intensifying screens 12 and 14 are improved more. But, the europium-activated barium fluorochloride phosphor is inexpensive in comparison with the praseodymium-activated gadolinium oxysulfide phosphor and contributes to the cost down of the intensifying screens 12 and 14. The praseodymium-activated gadolinium oxysulfide phosphor and the europium-activated barium fluorochloride phosphor can be used by suitably selecting depending on their characteristics.

A coating mass of the phosphor in the phosphor layer 17 is preferably determined depending on the transmissive fluorescence generating portion 11 or the reflective fluorescence generating portion 13 to which the intensifying screens 12 and 14 are applied. If the coating mass of the phosphor on the intensifying screen 12 of the transmissive fluorescence generating portion 11 is excessively large, light absorption takes place inside the phosphor layer 17, and a fluorescent emission power decreases. In addition, since absorption of the Compton scattered X-rays also occurs, the incident amount of the Compton scattered X-rays in the reflective fluorescence generating portion 13 decreases, and a total amount of visible lights decreases. In the reflective fluorescence generating portion 13, the light emission output increases as the coating mass of the phosphor on the intensifying screen 14 is increased, but if the coating mass is increased excessively, no further effect can be obtained and only an increase of the manufacturing cost or the like is caused.

Figure 10:
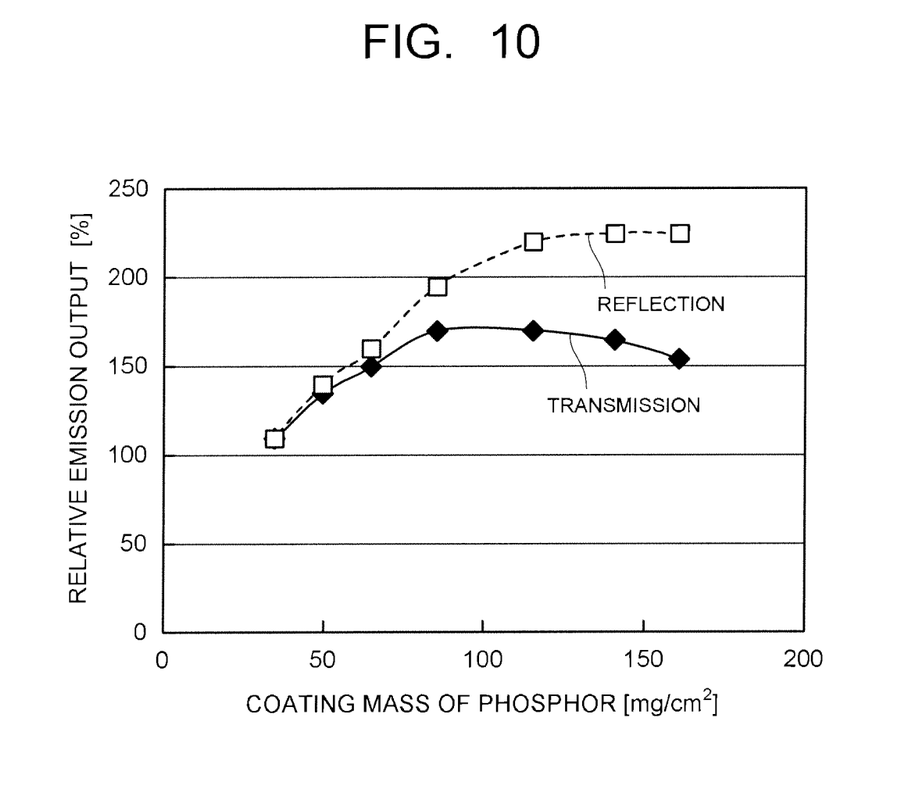
FIG. 10 is a diagram showing relationships between relative optical output and coating mass of phosphor of an intensifying screen of a transmissive fluorescence generating portion and that of phosphor of an intensifying screen of a reflective fluorescence generating portion.

FIG. 10 shows the light outputs when the europium-activated barium fluorochloride phosphor was used for the intensifying screen 12 of the transmissive fluorescence generating portion 11 and the intensifying screen 14 of the reflective fluorescence generating portion 13. The light outputs were measured at an X-ray tube voltage of 120 kVp using a photomultiplier R-980 (trade name, manufactured by Hamamatsu Photonix Co.) having a bialkali photoelectric surface. The vertical axis of FIG. 10 indicates relative optical outputs with a light output of LaOBr:Tb phosphor assumed to be 100. As shown in FIG. 10, it is preferable to appropriately determine the coating mass of the phosphor according to the transmissive fluorescence generating portion 11 or the reflective fluorescence generating portion 13.

Figure 11:
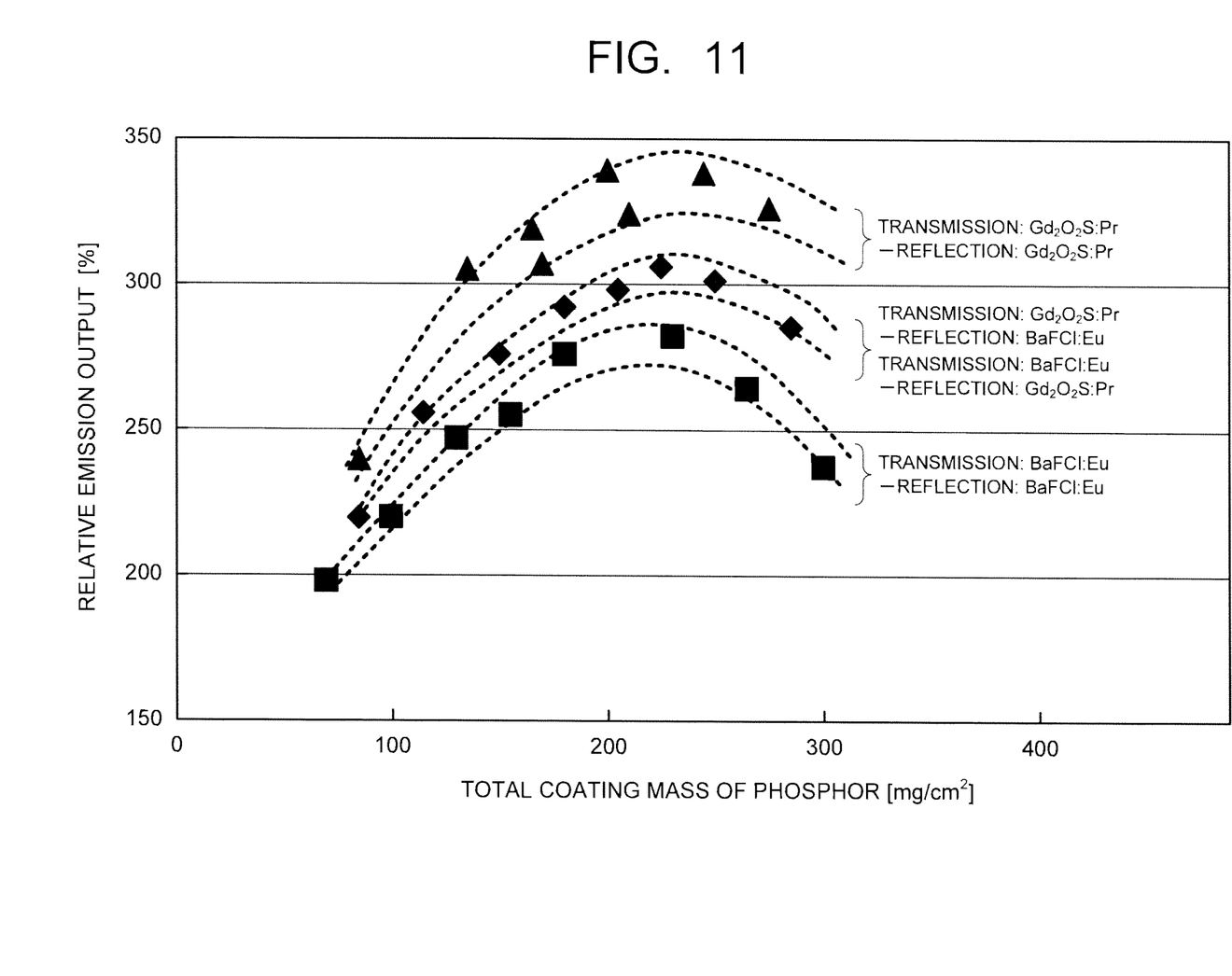
FIG. 11 is a diagram showing relationships between relative optical outputs and total coating mass of phosphors of an intensifying screen of a transmissive fluorescence generating portion and an intensifying screen of a reflective fluorescence generating portion.

As described above, the total amount of visible lights of the transmissive fluorescence generating portion 11 and the reflective fluorescence generating portion 13 is variable depending on the balance between the coating mass of the phosphor in the intensifying screen 12 and that in the intensifying screen 14. Therefore, it is preferable that the total coating mass of the phosphor is determined considering each coating mass of the phosphor in the intensifying screen 12 of the transmissive fluorescence generating portion 11 and the intensifying screen 14 of the reflective fluorescence generating portion 13. FIG. 11 shows relationships between relative optical outputs and total coating mass of the phosphors of the intensifying screens 12 and 14 based on the combinations of individual phosphors. It is preferable that the total coating mass of the phosphors is in a range of 80-300 mg/cm$^2$ though it is slightly variable depending on the combination of the phosphors. A good light output can be obtained by applying the total coating mass of the above range of phosphors.

Figure 12:
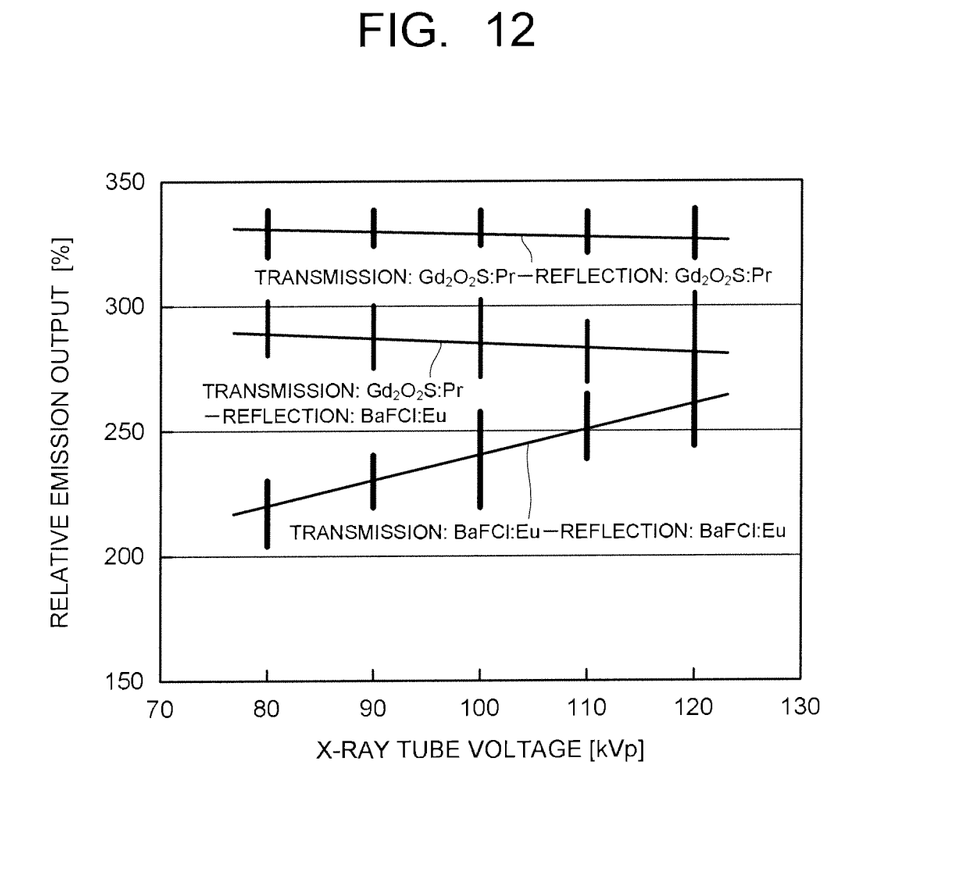
FIG. 12 is a diagram showing relationships between a combination of intensifying screens of a transmissive fluorescence generating portion and a reflective fluorescence generating portion and relative optical outputs and X-ray tube voltages of irradiated X-rays.

FIG. 12 shows relationships between relative optical outputs and X-ray tube voltages of X-rays irradiated to the intensifying screens 12 and 14 based on the combinations of typical phosphors. It is seen as shown in FIG. 12 that the relative optical outputs vary slightly depending on the combination of the X-ray tube voltages and the phosphors, but the intensifying screen 12 of the transmissive fluorescence generating portion 11 and the intensifying screen 14 of the reflective fluorescence generating portion 13 according to the embodiment can comply with a wide range of X-ray tube voltage. Therefore, they can be applied to various types of X-ray inspection apparatus. In addition, the combinations of the intensifying screens 12 and 14 of the transmissive fluorescence generating portion 11 and the reflective fluorescence generating portion 13 and the phosphors are not limited particularly. The intensifying screens 12 and 14 are appropriate when the praseodymium-activated gadolinium oxysulfide phosphor or the europium-activated barium fluorochloride phosphor is applied.

The scattering X-ray detector 6 of this embodiment is provided with any of a combination of the transmissive fluorescence generating portion 11 and the reflective fluorescence generating portion 13 with the praseodymium-activated gadolinium oxysulfide phosphor applied to the intensifying screens 12 and 14, a combination of the transmissive fluorescence generating portion 11 with the praseodymium-activated gadolinium oxysulfide phosphor applied to the intensifying screen 12 and the reflective fluorescence generating portion 13 with the europium-activated barium fluorochloride phosphor applied to the intensifying screen 14, a combination of the transmissive fluorescence generating portion 11 with the europium-activated barium fluorochloride phosphor applied to the intensifying screen 12 and the reflective fluorescence generating portion 13 with the praseodymium-activated gadolinium oxysulfide phosphor applied to the intensifying screen 14, and a combination of the transmissive fluorescence generating portion 11 and the reflective fluorescence generating portion 13 with the europium-activated barium fluorochloride phosphor applied to the intensifying screens 12 and 14. The transmitted X-ray detector 7 is also configured in the same manner.

As described above, the intensifying screens 12 and 14 are provided with the support 16 and the phosphor layer 17 which is formed on it. As shown in FIG. 4, the intensifying screens 12 and 14 may be provided with a protection film 18 which is formed on the phosphor layer 17. By covering the phosphor layer 17 with the protection film 18, the phosphor particles can be suppressed from dropping from the phosphor layer 17, and the phosphor layer 17 can be suppressed from delaminating. The support 16 and the protection film 18 are preferably determined to be formed of a transparent or opaque resin film. The transmission type intensifying screen applies a transparent resin film to either or both of the support 16 and the protection film 18. In a case where the reflection type intensifying screen is configured, a transparent resin film is applied to one of the support 16 and the protection film 18, and an opaque resin film is applied to the other.

The transmissive fluorescence generating portion 11 is provided with the transmission type intensifying screen 12. The transmission type intensifying screen 12 which has a transparent resin film applied to one of the support 16 or the protection film 18 is arranged to have the transparent resin film directed toward the inside of the detector main body 9. The reflection type intensifying screen 14 is basically applied to the reflective fluorescence generating portion 13. But, when the X-ray detectors 6 and 7 have a structure that can reflect the light emitted by the intensifying screen 14 on the detector main body 9 or a reflecting member or the like which is arranged between the detector main body 9 and the intensifying screen 14, the transmission type intensifying screen 14 can be applied to the reflective fluorescence generating portion 13. Especially, the transmission type intensifying screen 14, which has a transparent resin film applied to both the support 16 and the protection film 18, can obtain light emission from both the support 16 side and the protection film 18 side, so that the light emission output can be improved furthermore.

Since the praseodymium-activated gadolinium oxysulfide phosphor and the europium-activated barium fluorochloride phosphor tend to be deteriorated by water, it is preferable that the phosphor layer 17 is covered by the support 16 and the protection film 18, and a resin film, through which water penetrates hardly, is used for the support 16 and the protection film 18. It is preferable that the support 16 and the protection film 18 are composed of a resin film having a moisture vapor transmission rate of 20 g/m²/24 hr/0.1 mm or less to suppress the phosphor from being deteriorated by moisture or the like contained in air, and it is more preferable that they are formed of a polyethylene terephthalate film having the above moisture vapor transmission rate.

As shown in FIG. 5, it is also effective to form a sealed portion 19 by overlaying an end portion 16a of the support 16 and an end portion 18a of the protection film 18 and applying heat and pressure to the overlaid portion. Simple covering of the phosphor layer 17 by the protection film 18 cannot prevent completely the contact between the phosphor layer 17 and the moisture in air. On the other hand, the phosphor layer 17 can be shielded from the moisture and the like in air by covering the phosphor layer 17 with the support 16 and the protection film 18 which are formed of the resin film and shielding the end portions 16a and 18a by thermocompression bonding. Therefore, it becomes possible to substantially suppress the praseodymium-activated gadolinium oxysulfide phosphor or the europium-activated barium fluorochloride phosphor which forms the phosphor layer 17 from being degraded due to moisture.

As specific examples of the X-ray detector of this embodiment, various combinations of the intensifying screen 12 of the transmissive fluorescence generating portion 11 and the intensifying screen 14 of the reflective fluorescence generating portion 13 are shown in Table 1. Table 1 shows relative optical outputs with the intensifying screen 12 and the intensifying screen 14 combined under various types of conditions. The relative optical outputs were measured according to the above-described method. In Table 1, the particle size distribution shows a ratio (% by volume) of particles having a particle diameter falling in a range of [D±0.3D] with respect to the center particle diameter D of the phosphor particles. In the column of the support, PET1 is a transparent polyethylene terephthalate film, and PET2 is a white (opaque) polyethylene terephthalate film.

The column of the pressing conditions in Table 1 shows conditions that pressing is performed after applying the slurry mixture of the phosphor particles and the binder on the support. In the column of the pressing conditions, Condition 1 uses a press machine to press under conditions of a temperature of 60° C., a pressure of 5 MPa, and a time of 10 minutes or uses a roll press machine to continuously press under conditions of a temperature of 80° C., a pressure of 1 MPa, and a line speed of 1 m/min. And, Condition 2 uses a press machine to press under conditions of a temperature of 70° C., a pressure of 40 MPa, and a time of 30 minutes or uses a roll press machine to continuously press under conditions of a temperature of 100° C., a pressure of 10 MPa, and a line speed of 0.5 m/min.

TABLE 1

| | Intensifying scree of transmissive fluorescence generating portion | | | | | | Intensifying screen of reflective fluorescence generating portion | | | | | | |
|---|---|---|---|---|---|---|---|---|---|---|---|---|---|
| | Phosphor | | | | | | Phosphor | | | | | | |
| | | Particle size distribution | Composition ratio of phosphor layer [% by volume] | | | | | Particle size distribution | Composition ratio of phosphor layer [% by volume] | | | | Relative optical |
| | Composition | [% by volume] | Phosphor | Resin | Voids | Support | Press condition | Composition | [% by volume] | Phosphor | Resin | Voids | Support | Press condition | output [%] |
| E1 | $Gd_2O_2S$:Pr | 61 | 60 | 5 | 35 | PET1 | CDN2 | $Gd_2O_2S$:Pr | 61 | 60 | 5 | 35 | PET1 | CDN2 | 339 |
| E2 | $Gd_2O_2S$:Pr | 50 | 68 | 9 | 23 | PET1 | CDN2 | $Gd_2O_2S$:Pr | 50 | 68 | 9 | 23 | PET1 | CDN2 | 322 |
| E3 | $Gd_2O_2S$:Pr | 46 | 75 | 15 | 10 | PET1 | CDN2 | $Gd_2O_2S$:Pr | 46 | 75 | 15 | 10 | PET1 | CDN2 | 237 |
| CE1 | $Gd_2O_2S$:Pr | 42 | 50 | 3 | 47 | PET1 | CDN1 | $Gd_2O_2S$:Pr | 42 | 50 | 3 | 47 | PET1 | CDN1 | 275 |
| CE2 | $Gd_2O_2S$:Pr | 42 | 50 | 3 | 47 | PET1 | CDN1 | $Gd_2O_2S$:Pr | 61 | 60 | 5 | 35 | PET1 | CDN2 | 285 |
| CE3 | $Gd_2O_2S$:Pr | 61 | 60 | 5 | 35 | PET1 | CDN2 | $Gd_2O_2S$:Pr | 42 | 50 | 3 | 47 | PET1 | CDN1 | 283 |
| E4 | BaFCl:Eu | 59 | 45 | 10 | 45 | PET1 | CDN2 | BaFCl:Eu | 59 | 45 | 10 | 45 | PET1 | CDN2 | 282 |
| E5 | BaFCl:Eu | 52 | 52 | 15 | 33 | PET1 | CDN2 | BaFCl:Eu | 52 | 52 | 15 | 33 | PET1 | CDN2 | 269 |
| E6 | BaFCl:Eu | 45 | 60 | 20 | 20 | PET1 | CDN2 | BaFCl:Eu | 45 | 60 | 20 | 20 | PET1 | CDN2 | 241 |
| CE4 | BaFCl:Eu | 43 | 38 | 7 | 55 | PET1 | CDN1 | BaFCl:Eu | 43 | 38 | 7 | 55 | PET1 | CDN1 | 210 |
| C7 | $Gd_2O_2S$:Pr | 46 | 75 | 15 | 10 | PET1 | CDN2 | BaFCl:Eu | 45 | 60 | 20 | 20 | PET1 | CDN2 | 306 |
| C8 | BaFCl:Eu | 45 | 60 | 20 | 20 | PET1 | CDN2 | $Gd_2O_2S$:Pr | 46 | 75 | 15 | 10 | PET1 | CDN2 | 298 |
| CE5 | $Gd_2O_2S$:Pr | 42 | 50 | 3 | 47 | PET1 | CDN1 | BaFCl:Eu | 43 | 38 | 7 | 55 | PET1 | CDN1 | 253 |
| CE6 | BaFCl:Eu | 43 | 38 | 7 | 55 | PET1 | CDN1 | $Gd_2O_2S$:Pr | 42 | 50 | 3 | 47 | PET1 | CDN1 | 246 |
| CE7 | $Gd_2O_2S$:Pr | 61 | 60 | 5 | 35 | PET1 | CDN2 | LaOBr:Tm | 48 | 66 | 15 | 19 | PET1 | CDN2 | 214 |
| CE8 | LaOBr:Tm | 48 | 66 | 15 | 19 | PET1 | CDN2 | $Gd_2O_2S$:Pr | 61 | 60 | 5 | 35 | PET1 | CDN2 | 203 |
| CE9 | BaFCl:Eu | 59 | 45 | 10 | 45 | PET1 | CDN2 | LaOBr:Tm | 48 | 66 | 15 | 19 | PET1 | CDN2 | 193 |
| CE10 | LaOBr:Tm | 48 | 66 | 15 | 19 | PET1 | CDN2 | BaFCl:Eu | 59 | 45 | 10 | 45 | PET1 | CDN2 | 189 |
| E9 | $Gd_2O_2S$:Pr | 61 | 60 | 5 | 35 | PET2 | CDN2 | $Gd_2O_2S$:Pr | 61 | 60 | 5 | 35 | PET2 | CDN2 | 580 |
| E10 | BaFCl:Eu | 59 | 45 | 10 | 45 | PET2 | CDN2 | BaFCl:Eu | 59 | 45 | 10 | 45 | PET2 | CDN2 | 457 |

C1 to C10 = Example 1 to Example 10
CE1 to CE10 = Comparative Example 1 to Comparative Example 10
CDN1 = CONDITION 1
CDN2 = CONDITION 2

It is apparent from Table 1 that a high light output can be obtained by applying to each of the transmissive fluorescence generating portion 11 and the reflective fluorescence generating portion 13, an intensifying screen having a phosphor layer in which the praseodymium-activated gadolinium oxysulfide phosphor particles have a particle size distribution of 45% by volume or more and a filling rate of 60% by volume or more, an intensifying screen having a phosphor layer in which the europium-activated barium fluorochloride phosphor particles have a particle size distribution of 45% or more and a filling rate of 45% by volume or more, or a combination of them. The detection sensitivity of the Compton scattered X-rays is improved by enhancing the light outputs of the transmissive fluorescence generating portion 11 and the reflective fluorescence generating portion 13. The detection sensitivity of the transmitted X-rays is also the same. Therefore, the inside of the luggage 5 can be imaged more clearly by the X-ray inspection apparatus, and it becomes possible to inspect more accurately. When the light outputs of the fluorescence generating portions 11 and 13 are enhanced, the volume of the X-ray tube 1 can also be lowered. It contributes to miniaturization of the X-ray inspection apparatus.

In the above-described embodiment, the scattering X-ray detector 6 was described mainly, but the transmitted X-ray detector 7 is also the same. Detection sensitivity of the transmitted X-rays can be improved by applying to the transmitted X-ray detector 7 an intensifying screen having a phosphor layer in which praseodymium-activated gadolinium oxysulfide phosphor particles have a particle size distribution of 45% by volume or more and a filling rate of 60% by volume or more, or an intensifying screen having a phosphor layer in which europium-activated barium fluorochloride phosphor particles have a particle size distribution of 45% or more and a filling rate of 45% by volume or more. The X-ray inspection apparatus having the scattering X-ray detector 6 and the transmitted X-ray detector 7 can be used not only for the airport luggage inspection system but also for various types of security systems.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An intensifying screen for an X-ray detector, comprising:
    a support; and
    a phosphor layer, formed on the support, containing phosphor particles made of a praseodymium-activated gadolinium oxysulfide phosphor and a binder,
    wherein the phosphor particles have a particle size distribution in which a ratio of particles having a particle diameter falling in a range of [D1±0.3D1] with respect to a center particle diameter D1 of the phosphor particles is 45% by volume or more, and a filling rate of the phosphor particles in the phosphor layer is 60% by volume or more.

2. The intensifying screen according to claim 1,
    wherein the center particle diameter D1 of the phosphor particles is in a range of 1 μm or more and 20 μm or less.

3. The intensifying screen according to claim 1,
    wherein the filling rate of the phosphor particles in the phosphor layer is in a range of 60% by volume or more and 75% by volume or less.

4. The intensifying screen according to claim 1,
    wherein the phosphor layer contains the phosphor particles in a range of 60% by volume or more and 75% by volume or less, the binder in a range of 5% by volume or more and 15% by volume or less, and voids in a range of 10% by volume or more and 35% by volume or less.

5. The intensifying screen according to claim 1, further comprising a protection film disposed on the phosphor layer,
    wherein the support and the protection film comprise a transparent or an opaque resin film.

6. The intensifying screen according to claim 5,
    wherein the resin film is composed of a polyethylene terephthalate film having a moisture vapor transmission rate of 20 g/m$^2$/24 hr/0.1 mm or less.

7. The intensifying screen according to claim 5,
    wherein the phosphor layer is sealed by the support and the protection film which are composed of the resin film.

8. An intensifying screen for an X-ray detector, comprising:
    a support; and
    a phosphor layer, formed on the support, containing phosphor particles made of a europium-activated barium fluorochloride phosphor and a binder,
    wherein the phosphor particles have a particle size distribution in which a ratio of particles having a particle diameter falling in a range of [D2±0.3D2] with respect to a center particle diameter D2 of the phosphor particles is 45% by volume or more, and a filling rate of the phosphor particles in the phosphor layer is 45% by volume or more.

9. The intensifying screen according to claim 8,
    wherein the center particle diameter D2 of the phosphor particles is in a range of 1 μm or more and 20 μm or less.

10. The intensifying screen according to claim 8,
    wherein the filling rate of the phosphor particles in the phosphor layer is in a range of 45% by volume or more and 60% by volume or less.

11. The intensifying screen according to claim 8,
    wherein the phosphor layer contains the phosphor particles in a range of 45% by volume or more and 60% by volume or less, the binder in a range of 10% by volume or more and 20% by volume or less, and voids in a range of 20% by volume or more and 45% by volume or less.

12. The intensifying screen according to claim 8, further comprising a protection film which is disposed on the phosphor layer,
    wherein the support and the protection film comprise a transparent or opaque resin film.

13. The intensifying screen according to claim 12,
    wherein the resin film is composed of a polyethylene terephthalate film having a moisture vapor transmission rate of 20 g/m$^2$/24 hr/0.1 mm or less.

14. The intensifying screen according to claim 12,
    wherein the phosphor layer is sealed by the support and the protection film which are composed of the resin film.

15. An X-ray detector, comprising:
    a cabinet shape detector main body having an X-ray incident portion;
    a transmissive fluorescence generating portion disposed on the incident portion;
    a reflective fluorescence generating portion disposed on a portion of the detector main body except on the incident portion; and
    a photoelectric conversion portion disposed in the detector main body,
    wherein the transmissive fluorescence generating portion and the reflective fluorescence generating portion are respectively provided with an intensifying screen according to claim 1.

16. An X-ray detector, comprising:
    a cabinet shape detector main body having an X-ray incident portion;
    a transmissive fluorescence generating portion disposed on the incident portion;

a reflective fluorescence generating portion disposed on a portion of the detector main body except on the incident portion; and a photoelectric conversion portion disposed in the detector main body, wherein the transmissive fluorescence generating portion and the reflective fluorescence generating portion are respectively provided with an intensifying screen according to claim 8.

17. An X-ray detector, comprising:

a cabinet shape detector main body having an X-ray incident portion;

a transmissive fluorescence generating portion disposed on the incident portion;

a reflective fluorescence generating portion disposed on a portion of the detector main body except on the incident portion; and a photoelectric conversion portion disposed in the detector main body, wherein one of:
   (a) the transmissive fluorescence generating portion is provided with a first intensifying screen according to claim 1, and the reflective fluorescence generating portion is provided with a second intensifying screen, or
   (b) the transmissive fluorescence generating portion is provided with the second intensifying screen, and the reflective fluorescence generating portion is provided with the first intensifying screen, and wherein the second intensifying screen comprises:
   a support; and
   a phosphor layer, formed on the support of the second intensifying screen, containing phosphor particles made of a europium-activated barium fluorochloride phosphor and a binder,
   wherein the phosphor particles in the phosphor layer of the second intensifying screen have a particle size distribution in which a ratio of particles having a particle diameter falling in a range of [D2±0.3D2] with respect to a center particle diameter D2 of the phosphor particles in the phosphor layer of the second intensifying screen is 45% by volume or more, and a filling rate of the phosphor particles in the phosphor layer of the second intensifying screen is 45% by volume or more.

18. An X-ray inspection apparatus, comprising:

an X-ray irradiation unit for irradiating X-rays to an inspected object;

an X-ray detection unit for detecting Compton scattered X-rays from the inspected object or transmitted X-rays transmitted through the inspected object; and a display unit for showing an image of an inside of the inspected object on a basis of an X-ray intensity detected by the X-ray detection unit, wherein the X-ray detection unit is provided with an X-ray detector according to claim 15.

19. An X-ray inspection apparatus, comprising:

an X-ray irradiation unit for irradiating X-rays to an inspected object;

an X-ray detection unit for detecting Compton scattered X-rays from the inspected object or transmitted X-rays transmitted through the inspected object; and a display unit for showing an image of an inside of the inspected object on a basis of an X-ray intensity detected by the X-ray detection unit, wherein the X-ray detection unit is provided with an X-ray detector according to claim 16.

20. An X-ray inspection apparatus, comprising:

an X-ray irradiation unit for irradiating X-rays to an inspected object;

an X-ray detection unit for detecting Compton scattered X-rays from the inspected object or transmitted X-rays transmitted through the inspected object; and a display unit for showing an image of an inside of the inspected object on a basis of an X-ray intensity detected by the X-ray detection unit, wherein the X-ray detection unit is provided with an X-ray detector according to claim 17.

* * * * *